United States Patent
Clark et al.

(10) Patent No.: US 9,059,991 B2
(45) Date of Patent: Jun. 16, 2015

(54) SYSTEM AND METHOD FOR UNLOCKING A DEVICE

(75) Inventors: David Clark, Montreal (CA); Jonathan Arsenault, Montreal (CA); Stephane Fortier, Montreal (CA)

(73) Assignee: BCE Inc., Montreal, Quebec (CA)

( * ) Notice: Subject to any disclaimer, the term of this patent is extended or adjusted under 35 U.S.C. 154(b) by 226 days.

(21) Appl. No.: 13/142,674

(22) PCT Filed: Jun. 15, 2009

(86) PCT No.: PCT/CA2009/000834
§ 371 (c)(1),
(2), (4) Date: Jun. 29, 2011

(87) PCT Pub. No.: WO2010/075623
PCT Pub. Date: Jul. 8, 2010

(65) Prior Publication Data
US 2011/0275348 A1    Nov. 10, 2011

Related U.S. Application Data

(60) Provisional application No. 61/141,750, filed on Dec. 31, 2008.

(51) Int. Cl.
*H04W 12/06* (2009.01)
*H04L 29/06* (2006.01)
*G06F 21/32* (2013.01)
*H04W 8/18* (2009.01)

(52) U.S. Cl.
CPC ............ *H04L 63/0861* (2013.01); *G06F 21/32* (2013.01); *H04W 8/18* (2013.01); *H04W 12/06* (2013.01)

(58) Field of Classification Search
CPC ..................................................... H04W 12/06
USPC .............. 455/410–411, 269, 563, 575, 422; 704/255, 273, 270.1, 270, 231, 275, 704/235, 246
See application file for complete search history.

(56) References Cited

U.S. PATENT DOCUMENTS 5,704,009 A    12/1997  Cline
5,805,674 A     9/1998  Anderson, Jr.
(Continued)

OTHER PUBLICATIONS

PCT International Searching Authority (CA), International Search Report, Sep. 4, 2009, PCT/CA2009/000834.
(Continued)

*Primary Examiner* — Michael T Vu
(74) *Attorney, Agent, or Firm* — Alexander Anishchenko; Borden Lardner Gervais LLP

(57) ABSTRACT

A system for unlocking a mobile device including: an input module configured to receive voice information; an output module configured to output an unlock signal; a processor connected to the input module and output module and configured to: receive the voice information from the input module; analyze the voice information; determine if the analyzed voice information matches with a predetermined voice profile; and if there is a match, send an unlock signal to the mobile device via an output module. A method for unlocking a mobile device including: receiving voice information from the mobile device; analyzing the voice information; determining if the analyzed voice information matches with a predetermined voice profile; and if there is a match, sending an unlock signal to the mobile device.

15 Claims, 5 Drawing Sheets

(56) References Cited

U.S. PATENT DOCUMENTS

| | | | |
|---|---|---|---|
| 6,078,886 | A | 6/2000 | Roe |
| 6,167,251 | A | 12/2000 | Segal |
| 6,185,536 | B1 | 2/2001 | Haber et al. |
| 6,532,446 | B1 | 3/2003 | King |
| 6,542,729 | B1 | 4/2003 | Chmaytelli |
| 6,801,765 | B1 * | 10/2004 | Roo et al. ............ 455/411 |
| 2003/0115490 | A1 | 6/2003 | Russo |
| 2007/0071180 | A1 * | 3/2007 | Kanada ............ 379/39 |
| 2007/0143824 | A1 | 6/2007 | Shahbazi |
| 2007/0177740 | A1 * | 8/2007 | Nakajima ............ 380/277 |
| 2007/0185718 | A1 * | 8/2007 | Di Mambro et al. ......... 704/273 |
| 2007/0205273 | A1 * | 9/2007 | Stevens ............ 235/383 |
| 2007/0281748 | A1 | 12/2007 | Piekarski |
| 2008/0256613 | A1 * | 10/2008 | Grover ............ 726/5 |

OTHER PUBLICATIONS

PCT International Searching Authority (CA), The Written Opinion of the International Searching Authority, Sep. 4, 2009, PCT/CA/2009/000834.

PCT International Searching Authority (CA), International Preliminary Report on Patentability, Jul. 14, 2011, PCT/CA/2009/000834.

* cited by examiner

SYSTEM AND METHOD FOR UNLOCKING A DEVICE

FIELD

This application relates to a system and method for unlocking a device, and in particular, to a system and method for remotely unlocking a mobile device based on a voice authentication.

BACKGROUND

Mobile communication devices (such as a PDA, smart phone, mobile phone etc.) are in use throughout everyday life. There is a significant amount of highly confidential and sensitive information stored on these devices, especially in the case of corporate-issued devices. Typically, these devices use a local password login scheme in order to grant access to the device and its content. The user must input his/her password prior to any action being taken with the device (with the possible exception of emergency calls). This system requires the user to type in an alphanumeric password using the keypad. However, having to manually type in a password can be inconvenient and/or difficult to do especially in one-handed use situations such as, for example, while driving or doing other tasks where one hand may be busy, such as walking while carrying a briefcase. In addition, password entry systems are typically only configured to work with a single device and for a single person i.e. if a user wishes to share access with another user, the user must share his/her password. Such sharing of passwords can lead to potential security breaches, especially if a user's password gets into the hands of an unauthorized individual.

Use of other biometric indicators such as fingerprints, voice authentication or the like have been proposed for use in limiting access/unauthorized use of a device. However, in order to be accurate and efficient, these biometric indicators typically require significant processing power and memory, both of which may be limited, especially on a mobile device. Further, some existing systems appear to generally focus on limiting access to the communications network rather than on limiting access to the mobile device itself.

There remains a need for an efficient and relatively simple but robust system and method for unlocking a device, and in particular, a mobile communications device.

SUMMARY

According to an aspect of this application, there is provided a method for unlocking a mobile device including: receiving voice information from the mobile device; analyzing the voice information; determining if the analyzed voice information matches with a predetermined voice profile; and if there is a match, sending an unlock signal to the mobile device.

In a particular case, the determining if the analyzed voice information matches may include: comparing the voice information with a plurality of predetermined voice profiles stored in a database; and determining if there is a match between the analyzed voice information and at least one of the plurality of predetermined voice profiles.

In a particular case, the method may further include receiving mobile device information and the determining may further include determining if the analyzed voice information matches with a predetermined voice profile that is associated with the received mobile device information. In this case, there may be a plurality of predetermined voice profiles associated with the mobile device information and, if there is a match, the method may further include sending user information to the mobile device indicating the user associated with the matched voice profile.

According to another aspect herein, there is provided a system for unlocking a mobile device including: an input module configured to receive voice information; an output module configured to output an unlock signal; a processor connected to the input module and output module and configured to: receive the voice information from the input module; analyze the voice information; determine if the analyzed voice information matches with a predetermined voice profile; and if there is a match, send an unlock signal to the mobile device via an output module.

In a particular case, the processor may be configured to determine if the analyzed voice information matches with a predetermined voice profile by: comparing the voice information with a plurality of predetermined voice profiles stored in a database; and determining if there is a match between the voice information and at least one of the plurality of predetermined voice profiles.

In this case, the input module may be further configured to receive mobile device information and the processor may be further configured to receive the mobile device information and determine if the analyzed voice information matches with a predetermined voice profile that is associated with the received mobile device information. In the case where there are a plurality of predetermined voice profiles associated with the mobile device information, if there is a match, the processor may be further configured to send user information associated with the matched voice profile to the mobile device indicating the user associated with the matched voice profile.

According to yet another aspect, there is provided a method for unlocking a mobile device including: receiving a wake command at the mobile device; connecting to a voice authentication server through a network; receiving voice information at the mobile device; sending the voice information from the mobile device to the voice authentication server; waiting for an unlock signal from the voice authentication server; and if an unlock signal is received, allowing access to the mobile device.

In a particular case, the method may further include receiving user information from the voice authentication server and the allowing access may include loading a user profile associated with the user information.

In another particular case, the method may further include sending mobile device information to the voice authentication server substantially simultaneously with the sending of the voice information.

According to still yet another aspect, there is provided a system for unlocking a mobile device including: an input module configured to receive information from a user of the mobile device; a communications module configure to send and receive information between the mobile device and a network; and a processor connected to the input module and the communications module and configured to: receive a wake up command from the input module; connect to a voice authentication server through the network; receive voice information from the input module; send the voice information from the mobile device to the voice authentication server; wait for an unlock signal from the voice authentication server; and if an unlock signal is received, allow access to the mobile device.

In a particular case, the processor may be further configured to receive user information from the voice authentication server and the allowing access may include the processor loading a user profile associated with the user information.

In another particular case, the processor may be further configured to send mobile device information to the voice authentication server substantially simultaneously with the sending of the voice information.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which.

DETAILED DESCRIPTION

Figure 1:
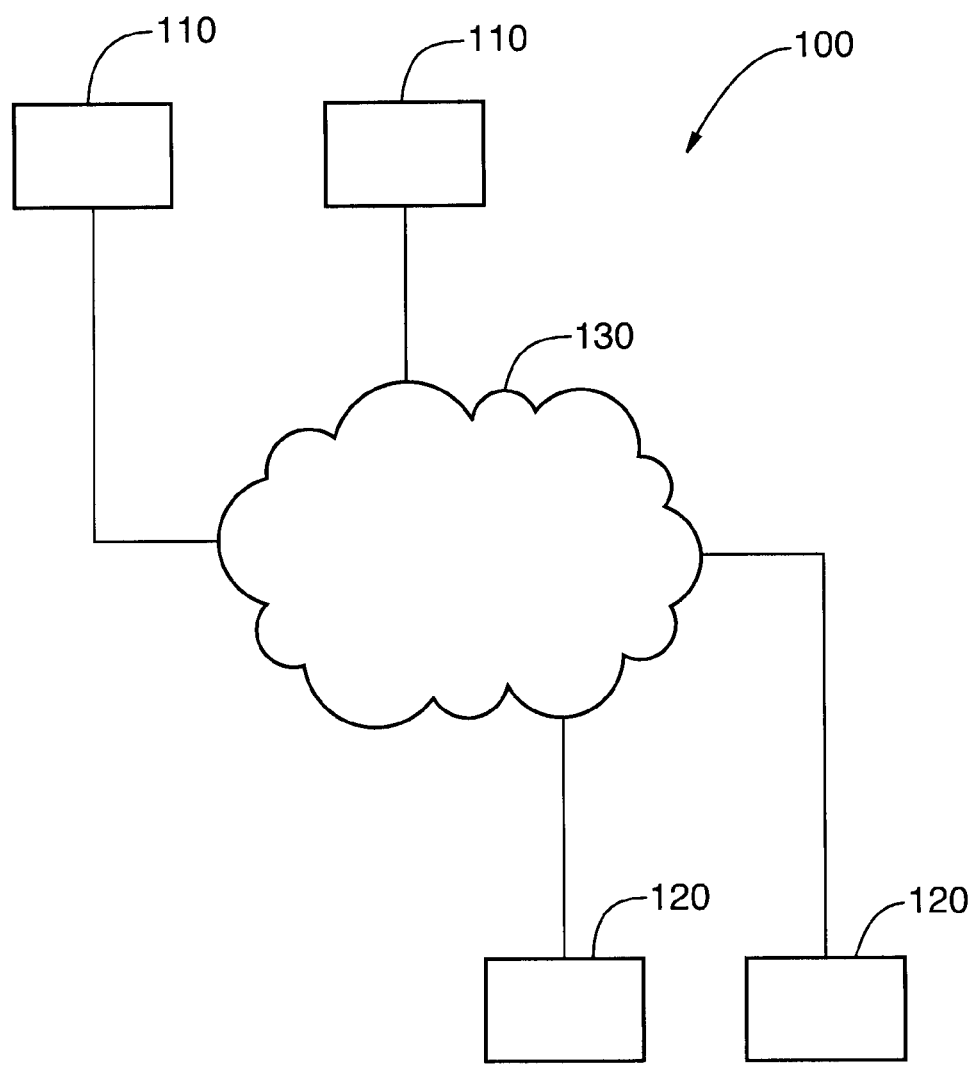
FIG. 1 is a block diagram of an exemplary embodiment of a system for unlocking a mobile device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Generally speaking, the embodiments herein relate to the use of a network-based voice authentication system to issue an "unlock" command to a mobile device (such as a smart phone, cell phone, or the like). Some embodiments are intended to provide a hands-free, voice-enabled capability to unlock access to a mobile device.

FIG. 1 shows an example embodiment of a mobile communication system 100. A mobile device 110 is connected to a voice authentication server 120 via a network 130. It will be understood that there may be a plurality of mobile devices 110 and/or voice authentication servers 120. Further, the connection may be through one or more networks 130, including wireless and wired networks as will be familiar to those of skill in the art. In this embodiment, the mobile device 110 is configured to be activated, for example, by a "wake up" command that is triggered by, for example, a user-issued voice command or a predefined key or key sequence input by the end user or the like. This activation puts the mobile device 110 into a listen state for accepting an unlock voice command. Based on the input of the unlock voice command, the mobile device then connects to (via, for example, an autodial function) a predetermined network address (for example, a phone number) that terminates the end user (sometimes referred to as the customer) at the network-based voice authentication server 120. In making the connection, the caller line identification (CLID) of the mobile device 110 may also be relayed over the network 130. The end user then utters a predefined command, such as "unlock", which is then analyzed by the voice authentication server 120 against a pre-registered voice profile in order to authenticate/verify the user. Upon voice authentication of the user, the voice authentication server 120 issues a command to the mobile device 110 over the network to unlock access to the mobile device 110, thereby permitting normal use. If the voice authentication fails, an error or alternate handling process may be initiated.

The mobile device 110 is typically a two-way communication device, often with advanced data communication capabilities, having the capability to communicate in a wireless or wired fashion with other computing devices and includes the capability for voice communications. Examples of mobile communication devices include cellular phones, cellular smart-phones, wireless organizers, personal digital assistants, handheld communication devices, notebook computers and the like.

Figure 2:
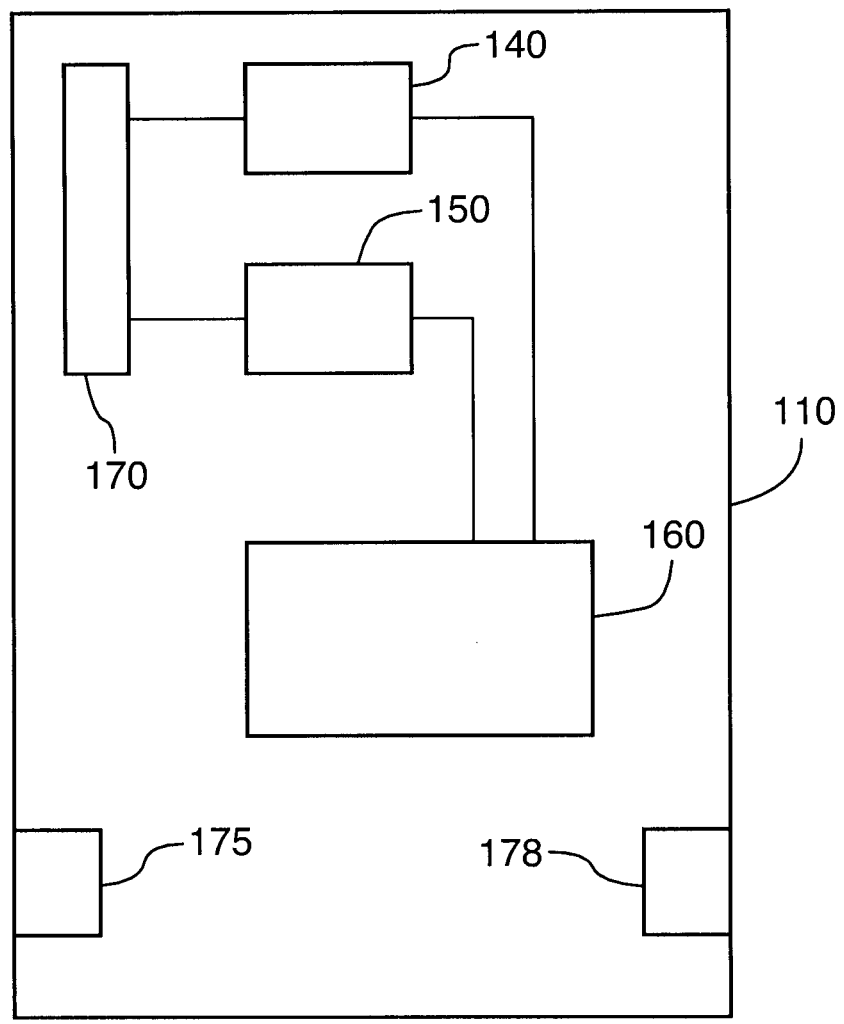
FIG. 2 is a block diagram of an exemplary embodiment of a mobile device.

FIG. 2 shows a block diagram of an exemplary embodiment of the mobile device 110. The mobile device 110 comprises a communications system including a receiver 140 and a transmitter 150, a communications processor 160, as well as associated components such as an internal antenna element 170 for wireless communication. The communications processor 160 may include, for example, a Digital Signal Processor (DSP) for processing received and transmitted signals. As will be apparent to those skilled in the field of communications, the particular design of the mobile device 110 may depend on the network 130 with which the mobile device 110 is intended to operate. Thus, it should be understood that the design illustrated in FIG. 2 serves only as an example.

Signals received by the antenna 170 from the network 130 are input to the receiver 140, which may be configured to perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 150, which may similarly be configured for digital-to-analog (D/A) conversion, frequency up conversion, filtering, amplification and transmission over the wireless network via the antenna 170. The communications processor 160 not only processes communication signals, but also typically provides for receiver 140 and transmitter 150 control. For example, the gain/attenuation applied to communication signals in the receiver 140 and transmitter 150 can be controlled through automatic gain/attenuation control algorithms implemented in the communications processor 160. It will be understood that the wireless link between the mobile device 110 and the network 130 can contain one or more different channels, typically different RF channels, and associated protocols used between the mobile device 110 and the network 130.

The mobile device 110 also includes an input mechanism (or interface) 175 such as a microphone and, in some cases input keys (e.g. keypad), and also includes an output mechanism (or interface) 178 such as a speaker and/or display. The mobile device 110 and input mechanism 175 are configured to allow entry of a "wake" command via voice command, via the keys (or keypad) or perhaps via a movement/gesture, such as movement of the mobile device 110 to the user's ear. In some cases, the wake command may simply involve turning the power on and, in other cases, may be used to wake the mobile device 110 from a low power or dormant state. Once the mobile device 110 is wakened, the mobile device 110 enters a "listen" state and is configured to receive a verbal/spoken unlock command via the microphone input mechanism 175. The unlock command comprises voice information that can be sent from the mobile device 110 to the voice authentication server 120. The voice information may be, for example, a stream of the verbal/spoken unlock command sent in real-time, a recording (analog or digital) of the unlock command, or may be a processed version of the unlock command (such as, for example, filtering/noise reduction, spectrum analysis, hash algorithm (analog or digital), or the like). In the case of a stream of the unlock command, the advantage is that the unlock process is commenced more quickly while there may be difficulties with packet loss, degradation or the like. The recording/processing of the verbal/spoken unlock command provides better quality but slightly delays the authentication process.

Figure 3:
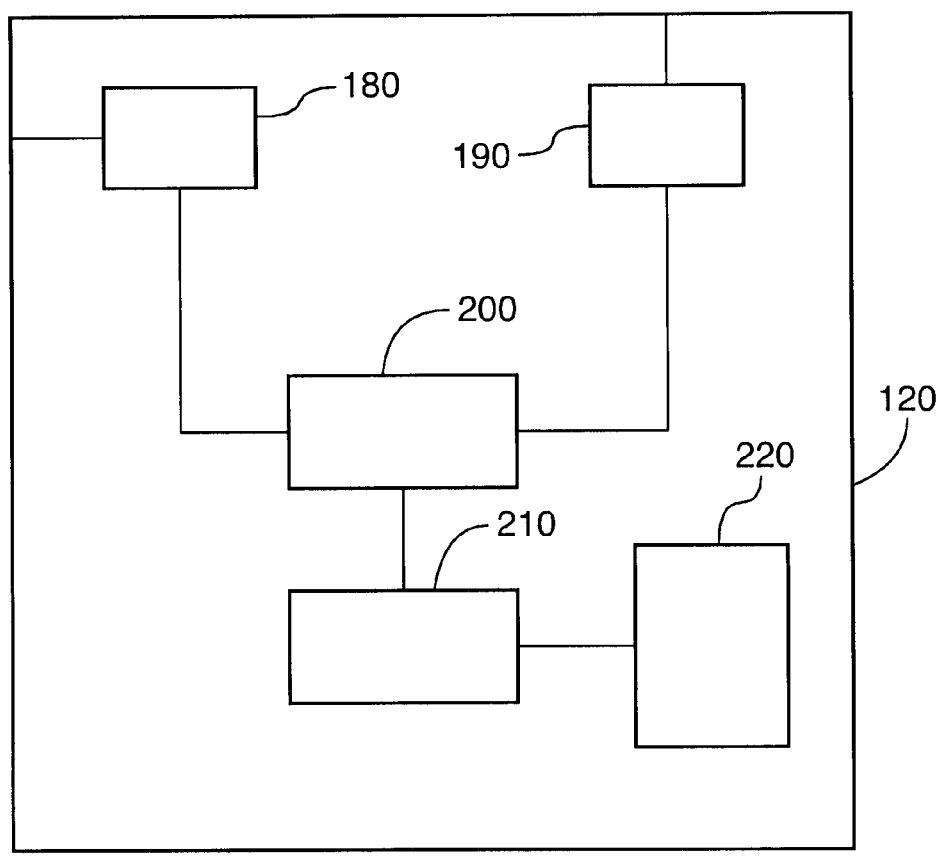
FIG. 3 is a block diagram of an exemplary embodiment of a voice authentication server.

FIG. 3 shows an example embodiment of the voice authentication server 120. The voice authentication server includes an input module 180, an output module 190, and a server processor 200 that is connected to and controls the input module 180 and the output module 190. The voice authentication server 120 further includes a voice-authentication module 210 that it is in communication with the server processor 200. The input module 180 and the output module 190 are in communication with the network 130 and are configured to receive and send data, messages, signals or the like according to the appropriate network protocol. It will be understood that the various elements, such as the server processor 200 and the voice authentication module 210, could be integrated into one component and that various functions may be shared among elements.

The server processor 200 is configured to receive voice information from the mobile device 110 via the input module 180 and provide the voice information to the voice-authentication module 210. The voice-authentication module 210 is configured to analyze the voice information received from the server processor 200. For example, in cases where a recording of the verbal/spoken unlock command is received from the mobile device 110, the voice-authentication module 210 may process the recording to extract voice characteristics, frequency maps or the like as is known in the field of voice authentication and generate voice information for comparison. The voice authentication module 210 then compares the analyzed voice information to one or more predetermined voice authentication profiles to determine if there is a match. The predetermined voice authentication profiles would generally be recorded by the user in advance and stored, for example, in a database 220 on the voice authentication server 120 (as shown in FIG. 3), on the network 130, or the like. In this case, the voice authentication server 120 may also be performing a voice identification function to identify a particular user based on the received/analyzed voice information.

The server processor 200 may also receive mobile device information that is related to the mobile device 110 being used, for example, a caller line identification (CLID) which will assist the voice authentication server 120 in determining the mobile device 110 for which activation is being sought. It will be understood that other types of mobile device information capable of identifying the mobile device 110 may also be used, such as for example, a unique identifier that is assigned to the mobile device 110 at manufacture, at registration on a particular mobile network, via a SIM card identifier, or the like.

It will be understood that the database 220 may include more than one voice authentication profile (i.e. user) for a particular mobile device 110. In the case where mobile device information is also received, the voice information received via the input module 180 may be compared with the predetermined voice authentication profiles for the various users that may be assigned to the particular mobile device 110.

Figure 4:
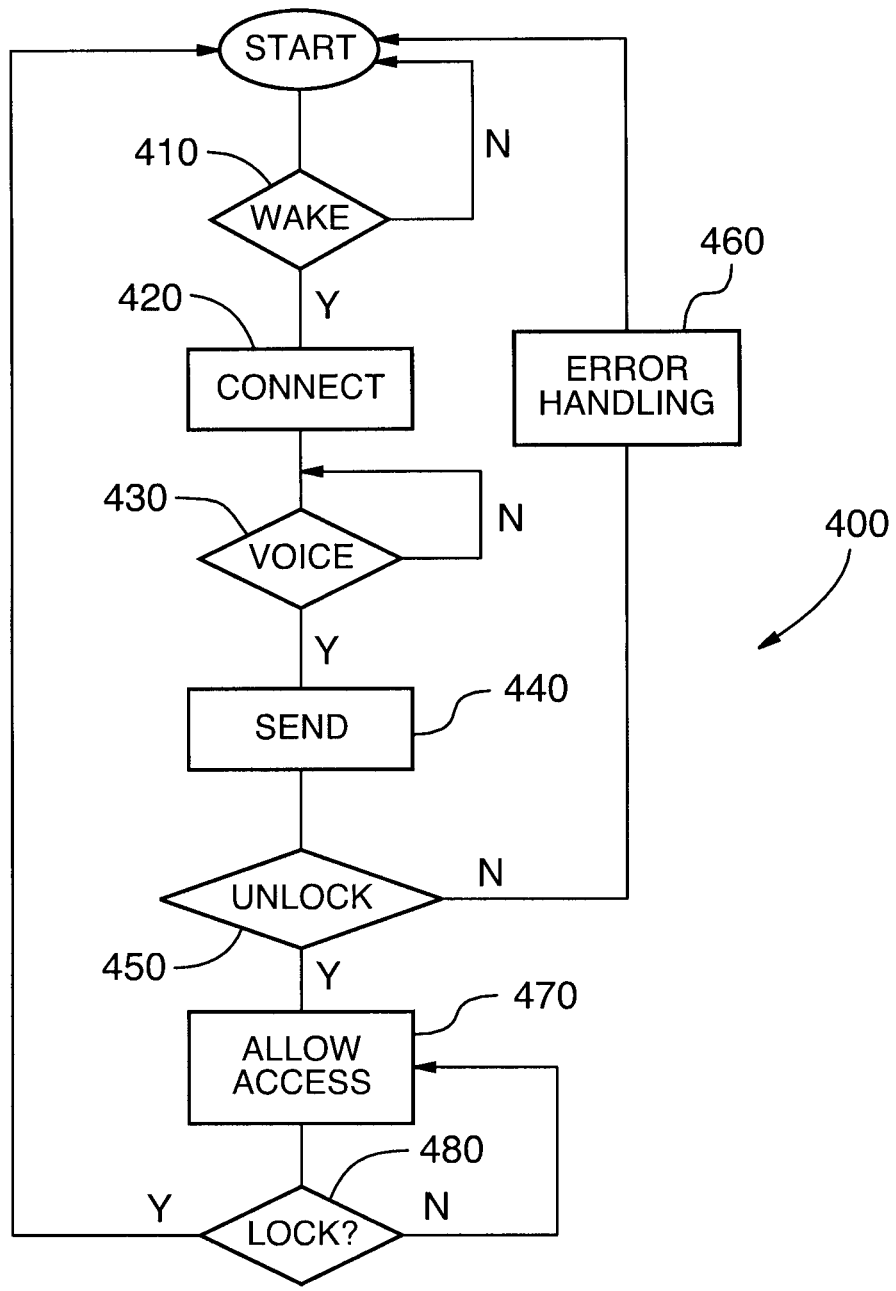
FIG. 4 is a flow chart of a method of unlocking a mobile device as implemented at a mobile device.

FIG. 4 shows a flowchart 400 of an example embodiment of a method of unlocking a mobile device via voice authentication that may be performed at the mobile device 110. The method starts in a wait state in which the mobile device 110 is waiting for a wake command (410). The wake command may be an input such as a key entry (random or not) or combination of key entries or may be a particular spoken command. On receiving the necessary command (Y at 410), the mobile device 110 wakes and connects to the voice authentication server 120 (420). The mobile device 110 then waits to receive voice information. For example, in a non-limiting embodiment, the word "unlock" from the end user (430) may be used to provide the voice information. It will be understood that the voice information may generally be any spoken sounds, typically a word or words. In some examples, the voice information may actually be obtained from the wake command itself, when the wake command takes the form of a spoken command. For example, the user may say "mobile unlock" as the wake command and the voice information may comprise a recording of the word "unlock" in the wake command.

The voice information received is then sent to the voice authentication server 120 (440). The mobile device 110 then waits to determine if an unlock signal or command is received from the voice authentication server 120 or not (450). If the unlock signal is not received, or in some embodiments, is not received within a pre-determined time period, the mobile device will perform error handling to indicate to the user that the voice authentication failed (460). It will be understood that the error handling may allow the user to make additional attempts to have voice information authenticated, but that this number will typically be limited. Alternatively, the error handling may include alternative access methods such as a voice response system allowing the user to speak a user name and password, or the like. If the unlock signal is received, the mobile device 110 will allow the user to access the mobile device 110 (470) until the mobile device is later put into lock mode again (480). It will be understood that the unlock signal from the voice authentication server 120 will generally be sent in an encrypted format. However, other security methods may also be used, for example, the voice authentication server 120 may send a "NONCE" number used only once, which could then be considered enough for the mobile device 110 to trust the identity of the voice authentication server 120.

Figure 5:
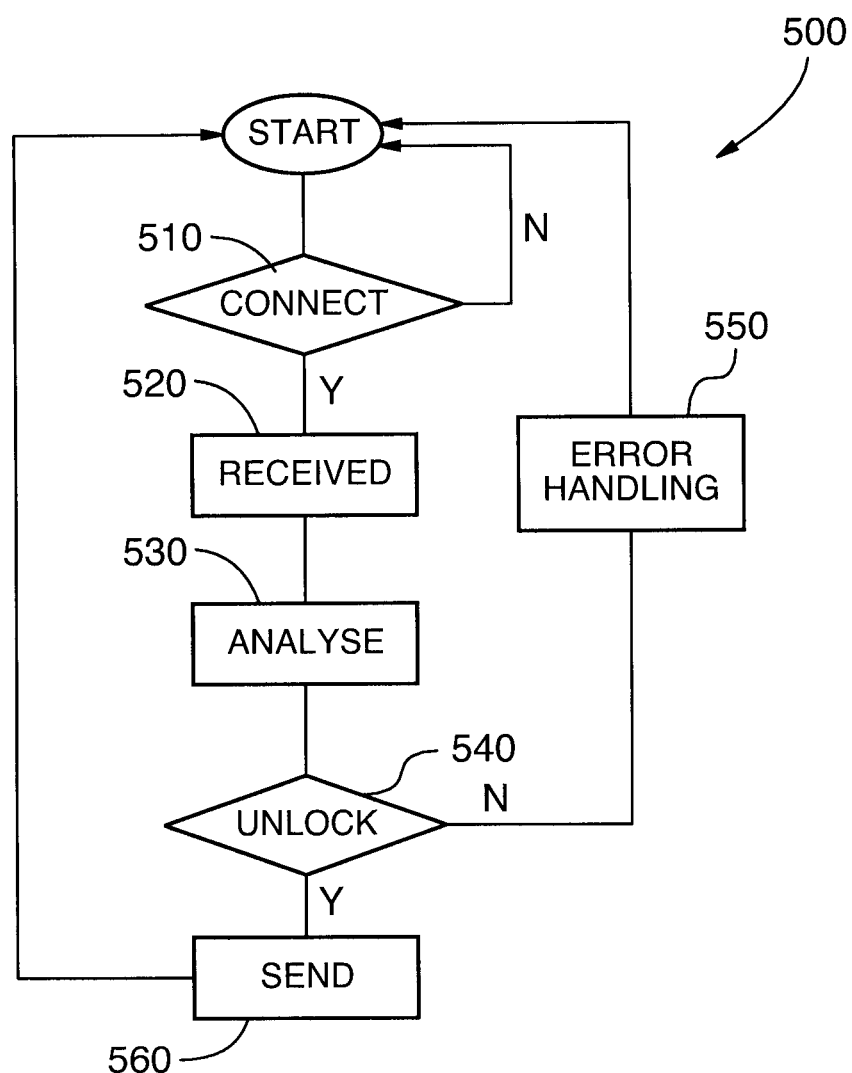
FIG. 5 is a flow chart of a method of unlocking a mobile device as implemented at a voice authentication server.

FIG. 5 is a flowchart 500 of an example embodiment of a method of unlocking a mobile device via voice authentication that may be performed at the voice authentication server 120. The method starts with the voice authentication server being in a wait state, waiting for a connect request from a mobile device (510). On receipt and acceptance of the connect request, the voice authentication server 120 receives voice information from the mobile device 110 (520). After receiving the voice information, the voice authentication server 120 analyzes the voice information (530) and attempts to validate it against stored information in the voice authentication database 220 to determine if the voice authentication is valid (e.g. determine if the analyzed voice information matches a predetermined voice authentication profile stored for that particular mobile device 110). Based on the analysis, the voice authentication server 120 then determines whether to unlock the mobile device 110 or not (540). If the voice authentication fails, the voice authentication server moves to an error handling procedure (550). The error handling procedure may include tracking the number of voice activation attempts or requests or waiting a pre-determined amount of time before re-setting the number of voice authentication requests or other error handling procedures. If the voice authentication is successful, the voice authentication server issues an unlock signal or command to the mobile device (560).

It will be understood that, in some embodiments, the voice authentication server 120 may also receive a signal indicating that the mobile device 110 is locked. In this way, the voice authentication server 120 can be aware of when the mobile device 110 is in a locked state.

It will further be understood that the particular network 130 used for communication between the mobile device 110 and the voice authentication server 120 may be a telephone network, a digital network such as an Internet, or other network as may be known in the art. In the case of the telephone network, the mobile device and voice authentication server may use a caller line identification (CLID) for identification of the mobile device. In a digital environment, the mobile device 110 and voice authentication server 120 may use a MAC address or SIM card information for identification of the mobile device 110.

As noted above, the systems and methods herein may also be configured to permit a device to be shared securely between users (for example, various voice authentication entries or profiles of all users authorized for access to a single device may be stored at the network level on the voice activation server). The systems and methods may also be configured to provide a simple solution for a single user to access multiple devices. In this case, a user's stored voice authentication profile may be associated with multiple devices (for example, all devices owned by the individual or all devices within a company or associated group/team). In the case of multiple devices, the differing acoustic characteristics of the devices may make it necessary to provide a voice profile for each device.

It will be understood that the voice authentication herein may also be used to enable a user-specific configuration/profile such as personal address book, buddies list etc. to be available on a mobile device in instances where a single device is shared amongst two or more authorized users. In this case, the voice authentication server 120 may send user information to the mobile device either together with or separate from the unlock signal such that the mobile device can load an appropriate user profile. Alternatively, the voice authentication server 120 may grant access to a user profile that is stored on the network and associated with the user and/or user information.

It is anticipated that the embodiments herein will provide greater security for sensitive data because voice authentication is typically considered as superior to alphanumeric passwords. Further, the use of voice authentication is intended to provide increased usability and easier access to locked mobile devices.

It will be understood that the systems and methods herein may be embodied in software or hardware or some combination thereof. In the case that the systems or methods are embodied in software, it will be understood that the software may be provided as computer-readable instructions on a physical medium that, when executed by a computing device, will cause the computing device to execute the instructions to implement the system or method.

It should be understood that various modifications can be made to the exemplary embodiments described and illustrated herein, without departing from the general scope of the appended claims. In particular, it should be understood that while the embodiments have been described for mobile devices, the embodiments may be generally applicable to computing devices requiring user authentication (such as a personal computer on a network (wired or wireless)). As such, according to an aspect herein, there is provided a method for unlocking a computing device, such as a personal computer, on a network wherein the method includes: receiving voice information from the computing device via the network; analyzing the voice information; determining if the analyzed voice information matches with a predetermined voice profile; and if there is a match, sending an unlock signal to the computing device. Similarly, according to another aspect, there is provided a method for unlocking a computing device on a network wherein the method includes: receiving a wake command at the computing device; connecting to a voice authentication server through the network; receiving voice information at the computing device; sending the voice information from the computing device to the voice authentication server; waiting for an unlock signal from the voice authentication server; and if an unlock signal is received, allowing access to the computing device.

We claim:

1. A method for unlocking a mobile device comprising:
   receiving, at a server, voice information from the mobile device;
   analyzing the voice information at the server;
   determining if the analyzed voice information matches with a predetermined voice profile, wherein the voice profile is associated with multiple mobile devices; and
   if there is a match, sending, via a network, an unlock signal to the mobile device and sending, via the network, user information to the mobile device, the user information revealing information about the user associated with the matched voice profile;
   wherein the determining comprises: comparing the voice information with a plurality of predetermined voice profiles stored in a database; and
   determining if there is a match between the voice information and at least one of the plurality of predetermined voice profiles.

2. The method according to claim 1, further comprising receiving mobile device information and wherein the determining further comprises determining if the analyzed voice information matches with a predetermined voice profile that is associated with the received mobile device information.

3. The method according to claim 2, wherein there are a plurality of predetermined voice profiles associated with the mobile device information.

4. A system for unlocking a mobile device comprising:
   an input module, at a server, configured to receive voice information;
   an output module, at the server, configured to output an unlock signal via a network;
   a processor, at the server, connected to the input module and output module and configured to:
   receive the voice information from the input module;
   analyze the voice information;
   determine if the analyzed voice information matches with a predetermined voice profile, wherein the voice profile is associated with multiple mobile devices; and
   if there is a match, having the output module send, via the network, an unlock signal to the mobile device and send, via the network, user information to the mobile device, the user information revealing information about the user associated with the matched voice profile;
   wherein the processor is configured to determine if the analyzed voice information matches with a predetermined voice profile by:

comparing the voice information with a plurality of predetermined voice profiles stored in a database; and
determining if there is a match between the voice information and at least one of the plurality of predetermined voice profiles.

5. The system according to claim 4, wherein the input module is further configured to receive mobile device information and wherein the processor is further configured to receive the mobile device information and determine if the analyzed voice information matches with a predetermined voice profile that is associated with the received mobile device information.

6. The system according to claim 5, wherein there are a plurality of predetermined voice profiles associated with the mobile device information.

7. A method for unlocking a mobile device comprising:
receiving a wake command at the mobile device to activate the mobile device to a listen state for connection to a voice authentication server;
connecting to the voice authentication server through a network;
receiving voice information at the mobile device;
sending the voice information from the mobile device to the voice authentication server;
waiting for an unlock signal from the voice authentication server, wherein the voice information is associable to unlock multiple mobile devices; and
if an unlock signal is received, allowing access to the mobile device,
wherein user information revealing information about the user associated with the matched voice profile is provided with the unlock signal;
wherein the determining comprises: comparing the voice information with a plurality of predetermined voice profiles stored in a database; and
determining if there is a match between the voice information and at least one of the plurality of predetermined voice profiles.

8. The method according to claim 7, wherein the allowing access comprises loading a user profile associated with the user information.

9. The method according to claim 7, further comprising sending mobile device information to the voice authentication server substantially simultaneously with the sending of the voice information.

10. The method according to claim 7, wherein the wake command is a user-issued voice command.

11. The method according to claim 7, wherein the wake command is a physical movement of the mobile device from a not in use position to a second position.

12. The method according to claim 7, wherein the wake command and the voice information are received as a single command.

13. A system for unlocking a mobile device comprising:
an input module configured to receive information from a user of the mobile device;
a communications module configure to send and receive information between the mobile device and a network; and
a processor connected to the input module and the communications module and configured to:
receive a wake up command from the input module to activate the mobile device to a listen state for connection to a voice authentication server;
connect to the voice authentication server through the network;
receive voice information from the input module;
send the voice information from the mobile device to the voice authentication server,
wherein the voice information is associable to unlock multiple mobile devices;
wait for an unlock signal from the voice authentication server; and
if an unlock signal is received, allow access to the mobile device,
wherein user information revealing information about the user associated with the matched voice profile is provided with the unlock signal;
wherein the determining comprises: comparing the voice information with a plurality of predetermined voice profiles stored in a database; and
determining if there is a match between the voice information and at least one of the plurality of predetermined voice profiles.

14. The system according to claim 13, wherein the allowing access comprises the processor loading a user profile associated with the user information.

15. The system according to claim 13, wherein the processor is further configured to send mobile device information to the voice authentication server substantially simultaneously with the sending of the voice information.

* * * * *